US 8,817,509 B2

(12) United States Patent
Taniguchi et al.

(10) Patent No.: US 8,817,509 B2
(45) Date of Patent: Aug. 26, 2014

(54) HIGH FREQUENCY POWER SUPPLY DEVICE

(75) Inventors: Michio Taniguchi, Tottori (JP);
Yoshinori Tsuruda, Osaka (JP)

(73) Assignee: Daihen Corporation, Osaka (JP)

( * ) Notice: Subject to any disclaimer, the term of this patent is extended or adjusted under 35 U.S.C. 154(b) by 88 days.

(21) Appl. No.: 13/417,674

(22) Filed: Mar. 12, 2012

(65) Prior Publication Data
US 2012/0250370 A1   Oct. 4, 2012

(30) Foreign Application Priority Data

Mar. 30, 2011   (JP) .................................. 2011-074121

(51) Int. Cl.
*H02M 7/539* (2006.01)
*H02M 7/537* (2006.01)

(52) U.S. Cl.
USPC ............................. 363/95; 363/140; 363/165

(58) Field of Classification Search
CPC ........... H02M 7/42; H02M 7/44; H02M 7/48; H02M 7/4807; H02M 7/537; H02M 7/539; H02M 2007/42; H02M 2007/44; H02M 2007/53
USPC ......... 363/95, 97, 131, 140, 65, 71, 164, 165; 323/208, 364

See application file for complete search history.

(56) References Cited

U.S. PATENT DOCUMENTS

| 7,265,528 | B2 | 9/2007 | Kotani et al. |
| 7,489,206 | B2 | 2/2009 | Kotani et al. |
| 7,615,983 | B2 | 11/2009 | Hamaishi et al. |
| 8,164,925 | B2 * | 4/2012 | Abe et al. .................. 363/21.02 |
| 2008/0158927 | A1 | 7/2008 | Omae et al. |

FOREIGN PATENT DOCUMENTS

| JP | 2007-185000 | 7/2007 |
| JP | 2011-229365 | 11/2011 |
| JP | 2012-50296 | 3/2012 |

* cited by examiner

*Primary Examiner* — Gary L Laxton
(74) *Attorney, Agent, or Firm* — Greenblum & Bernstein, P.L.C.

(57) ABSTRACT

There is provided a high frequency power supply device. The power control unit comprises an impedance adjuster that includes a variable reactance element and adjusts a load side impedance by changing a reactance value of the variable reactance element, and an impedance control unit that controls the variable reactance element of the impedance adjuster in response to a power value detected by a power detection unit so as to perform control of approximating the power value of the high frequency power, which is fed from the high frequency power generation unit to the load, to the setting value or control of maintaining the power value within the set allowable range by changing a resistance of the load side impedance in response to the power value detected by the power detection unit.

11 Claims, 9 Drawing Sheets

HIGH FREQUENCY POWER SUPPLY DEVICE

The disclosure of Japanese Patent Application No. 2011-074121 filed on Mar. 30, 2011, including specification, drawings and claims is incorporated herein by reference in its entirety.

BACKGROUND

The invention relates to a high frequency power supply device that feeds high frequency power to a load such as a plasma processing device.

As disclosed in Patent Document 1, a high frequency power supply device has been known which has a rectification smoothing circuit that converts a commercial alternating current voltage into a direct current voltage, a DC-DC converter that converts the direct current voltage obtained from the rectification smoothing circuit into an alternating current voltage and again converts the alternating current voltage into a direct current voltage and an inverter circuit that converts an output of the DC-DC converter into high frequency alternating current power and which controls an output voltage of the DC-DC converter, thereby approximating high frequency power to be fed to a load to a setting value.

FIG. 8 shows a configuration of the high frequency power supply device disclosed in Patent Document 1. In FIG. 8, a reference numeral 1 denotes a rectification smoothing circuit that rectifies an alternating current voltage obtained from a commercial power supply into a direct current voltage and smoothes the same, a reference numeral 2 denotes a DC-DC converter to which the direct current voltage obtained from the rectification smoothing circuit is input and a reference numeral 3 denotes an inverter circuit that an output of the DC-DC converter 2 into high frequency alternating current power.

As shown in FIG. 9, the inverter circuit 3 is a well-known circuit that has a switch circuit having switch elements S1 to S4, which are H-bridged, and feedback diodes D1 to D4, which are respectively inverse-parallel connected to the switch elements S1 to S4. The inverter circuit 3 alternately turns on the switch elements S1, S4, which configure a pair of one opposite sides of the H bridge, and the switch elements S2, S3, which configure the other pair of the other opposite sides, thereby converting the direct current voltage Vdc applied from the DC-DC converter 2 into a high frequency alternating current voltage Vinv having a rectangular waveform.

The high frequency alternating current voltage having a rectangular waveform, which is output from the inverter circuit 3, is converted into high frequency voltage and current of sinusoidal waveforms and then supplied to a load 7. In the shown example, the output of the inverter circuit is input to a primary side of a transformer 4 and an output of the transformer 4 is input the load 7 through a series resonance circuit 5 and a lowpass filter 6. The alternating current voltage and current having rectangular waveforms, which are output by the inverter circuit 3, are converted into the high frequency voltage and current of sinusoidal waveforms by the series resonance circuit 5 and the lowpass filter 6 and are then supplied to the load 7.

A reference numeral 8 denotes a voltage detection unit that detects the output voltage of the inverter circuit 3, a reference numeral 9 denotes a current detection unit that detects the output current Iinv of the inverter flowing between the inverter circuit 3 and the transformer 4, and a reference numeral 10 denotes a power detection unit that detects the high frequency power to be fed to the load 7.

An output of the voltage detection unit 8 and an output of the current detection unit 9 are input to a phase difference detection unit 11 that detects a phase difference of the output current of the inverter circuit 3 with respect to the output voltage and a detection value of the phase difference obtained from the phase difference detection unit 11 is applied to a frequency control unit 12' that generates a frequency instruction for determining an output frequency of the inverter circuit 3.

A reference numeral 13 denotes a high frequency signal generation unit that generates a high frequency signal of a sinusoidal waveform having a frequency instructed by the frequency instruction applied from the frequency control unit 12', a reference numeral 14 denotes a signal conversion unit that converts the high frequency signal output from the high frequency signal generation unit 13 into control signals V1, V2 to be applied to the switch elements of the inverter circuit 3 and a reference numeral 15 denotes a power control unit that performs control of approximating a power value of the high frequency power to be fed from the inverter circuit to the load to a setting value or maintaining the power value within a set allowable range.

The control signal V1 is a control signal that is applied to the control terminals of the switch elements S1, S4, which configure the pair of one opposite sides (sides of diagonal positions) of the H bridge configuring the inverter circuit 3, so as to turn on the switch elements S1, S4, and the control signal V2 is a control signal that is applied to the control terminals of the switch elements S2, S3, which configure the pair of the other opposite sides of the H bridge configuring the inverter circuit 3, so as to turn on the switch elements S2, S3. The high frequency signal generation unit 13 is comprised of a direct digital synthesizer (DDS) that generates a sinusoidal wave signal having a frequency as instructed by the applied frequency instruction.

In the high frequency power supply device disclosed in Patent Document 1, the output frequency of the inverter circuit 3 is controlled so that the phase difference of the high frequency alternating current and high frequency voltage, which are applied to the load, is small (preferably, zero) to the extent possible. When the output frequency of the inverter circuit is controlled as described above, a switching loss that occurs in the switch elements configuring the inverter circuit 3 can be reduced to improve the efficiency of the high frequency power supply device.

In a high frequency power supply device that feeds high frequency power to a load such as plasma processing device, it is necessary to maintain the high frequency power, which is applied to the load, at a setting value. In the high frequency power supply device shown in FIG. 8, it is necessary to perform the control of maintaining the high frequency power, which is applied from the inverter circuit 3 to the load through the transformer 4, the series resonance circuit 5 and the lowpass filter 6, at a setting value. Therefore, in the high frequency power supply device of the above type, although not particularly described in Patent Document 1, the output voltage of the DC-DC converter 2 that generates the direct current power to be input to the inverter circuit 3 is controlled to control the high frequency power that is fed to the load 7. In the example shown in FIG. 8, the output of the power detection unit 10 is applied to the power control unit 15. The power control unit 15 calculates a deviation between the detection value of the high frequency power, which is applied to the load 7, and the setting value and controls the value of the output voltage of the DC-DC converter 2 so that the calculated deviation approximates to zero (0). Thereby, the output voltage and output current of the inverter circuit 3 are controlled to keep the high frequency alternating current power, which is applied to the load 7, at the setting value.

In the example shown in FIG. 8, the rectification smoothing circuit 1 and the DC-DC converter 2 configure a direct current power supply unit. Also, the phase difference detection unit 11, the frequency control unit 12', the high frequency signal generation unit 13 and the signal conversion unit 14 configure an inverter control unit 25', and the inverter circuit 3, the transformer 4, the series resonance circuit 5, a filter unit 6, the voltage detection unit 8, the current detection unit 9 and the inverter control unit 25' configure a high frequency power generation unit PS'. Also, the direct current power supply unit configured by the rectification smoothing circuit 1 and the DC-DC converter 2, the high frequency power generation unit PS', the power detection unit 10 and the power control unit 15 configure the high frequency power supply device.

Patent Document 1: JP-A-2007-185000 (FIG. 4)

In the high frequency power supply device shown in FIG. 8, in order to perform the control of keeping the high frequency power to be applied to the load at the setting value, the DC-DC converter 2 capable of controlling the direct current output voltage is provided at a front stage of the inverter circuit 3 and the output voltage of the DC-DC converter 2 is controlled so that the power detected by the power detection unit 10 is kept at the setting value. Therefore, the configuration of the power supply device is complicated and the cost thereof is high.

Also, the DC-DC converter has a high-capacity smoothing capacitor therein, so that it takes to lower the output voltage thereof. Thus, the control responsiveness gets worse. In order to enhance the control responsiveness, it is necessary to provide a circuit that forcibly discharges the smoothing capacitor of the DC-DC converter, for example. Thereby, the circuit configuration is complicated.

Also, in FIG. 8, it may be considered that the DC-DC converter 2 is omitted and the switch elements of the inverter circuit 3 are PWM-controlled to keep the power, which is fed to the load 7, at the setting value. However, in order to PWM-control the switch elements of the inverter circuit 3, it is necessary to turn on/off the switch elements with a frequency remarkably higher than the output frequency of the inverter circuit 3. Therefore, when the output frequency of the inverter circuit 3 is high (for example, several 10 MHz to several 100 MHz for performance of the current switch element), it is difficult to adopt the above consideration.

SUMMARY

It is therefore an object of the present invention to provide a high frequency power supply device having a configuration in which an output voltage of a direct current power supply unit having a simple configuration, which does not have a function of controlling the output voltage, is directly input to an inverter circuit and thus the configuration is simplified and the cost thereof is reduced.

An aspect of the embodiments of the present invention is directed to a high frequency power supply device comprising: a direct current power supply unit configured to rectify and smooth an alternating current voltage and output a direct current voltage; a high frequency power generation unit having an inverter circuit configured to convert the direct current voltage output from the direct current power supply unit into an alternating current voltage, the high frequency power generation unit configured to generate high frequency power that is fed from the inverter circuit to a load; and a power control unit configured to perform control of approximating a power value of the high frequency power to be fed from the high frequency power generation unit to the load to a setting value or control of maintaining the power value within a set allowable range.

The high frequency power supply device comprises a current detection unit configured to detect an output current of the inverter circuit; a phase difference detection unit configured to detect a phase difference between the current detected by the current detection unit and an output voltage of the inverter circuit; a power detection unit configured to detect the high frequency power to be fed to the load; and a frequency control unit configured to control an output frequency of the inverter circuit within a predetermined frequency tuning range so that a phase of the current detected by the current detection unit is maintained at a state in which the phase is delayed with respect to a phase of the output voltage of the inverter circuit by a set delay amount, on the basis of an input that is the phase difference detected by the phase difference detection unit.

The power control unit comprises an impedance adjuster that comprises a plurality of reactance elements including at least one variable reactance element and adjusts a load side impedance, which is an impedance of a load side circuit seen from an output terminal of the high frequency power generation unit, by changing a reactance value of the variable reactance element, and an impedance control unit that controls the variable reactance element of the impedance adjuster in response to the power value detected by the power detection unit so as to perform control of approximating the power value of the high frequency power, which is fed from the high frequency power generation unit to the load, to the setting value or control of maintaining the power value within the set allowable range by changing a resistance of the load side impedance in response to the power value detected by the power detection unit.

The impedance of the load side circuit seen from the inverter circuit typically has a series resonance characteristic. When the impedance of the load side circuit seen from the inverter circuit has a series resonance characteristic, the impedance of the load side circuit seen from the inverter circuit becomes minimal and the power to be fed to the load becomes maximal when the output frequency of the inverter circuit is the same as the series resonance frequency. In an area in which the output frequency of the inverter circuit is higher than the series resonance frequency, the impedance shows an induction property and the phase of the output current of the inverter circuit is delayed, compared to the phase of the output voltage. Also, in an area in which the output frequency of the inverter circuit is lower than the series resonance frequency, the impedance of the load of the inverter circuit shows a capacitance property and the phase of the output current of the inverter circuit is faster than the phase of the output voltage.

In a power feeding system in which the high frequency power is fed from the inverter circuit, in which the switching operation of the current is performed, to the load having the series resonance characteristic, when the output frequency of the inverter circuit is set in the area in which the impedance of the load side circuit, rather than the inverter circuit, shows a capacitance property, the current waveform is largely distorted, which is accompanied by the switching operation of the current by the inverter circuit. However, when the output frequency of the inverter circuit is set in the area in which the impedance of the load side circuit, rather than the inverter circuit, shows an induction property, the waveform distortion of the current is relatively small.

Accordingly, when feeding the power from the inverter circuit to the load having the series resonance characteristic, it is necessary to enable the impedance of the load side circuit seen from the inverter circuit to express the induction property. Therefore, according to the invention, the output frequency of the inverter circuit is controlled within the predetermined range so that the phase of the current detected by the current detection unit is maintained at a state in which the phase of the current is delayed with respect to the phase of the voltage output from the inverter circuit by the set delay amount. Thereby, the impedance of the load side circuit seen from the inverter circuit is kept to be inductive, so that stability of the control is secured.

Also, when feeding the high frequency power from the high frequency power generation unit to the load, it is possible to increase the high frequency power that is fed from the high frequency power generation unit to the load by decreasing the resistance of the load side impedance, which is the impedance of the load side circuit seen from the output terminal of the high frequency power generation unit, and to decrease the high frequency power that is fed from the high frequency power generation unit to the load by increasing the resistance of the load side impedance.

Accordingly, the impedance adjuster that adjusts the load side impedance, which is the impedance of the load side circuit seen from the output terminal of the high frequency power generation unit, is provided and the impedance adjuster is controlled in response to the power value detected by the power detection unit, thereby increasing/decreasing the resistance of the load side impedance and thus approximating the high frequency power to be fed from the high frequency power generation unit to the load to the setting value or keeping the same within the allowable range.

In order to prevent the loss in the power control unit, regarding the impedance adjuster, an impedance adjuster is preferably used which consists of a plurality of reactance elements having at least one variable reactance element (which does not include a resistance element) and can adjust the load side impedance by changing the reactance value of the variable reactance element.

As described above, according to the invention, the impedance adjuster that adjusts the load side impedance, which is the impedance of the load side circuit seen from the output terminal of the high frequency power generation unit, is provided and the output frequency of the inverter circuit is controlled so that the phase of the output current of the inverter circuit is maintained at the state in which the phase of the output current is delayed with respect to the output voltage by the set delay amount, thereby securing the stability of the control. Also, the impedance adjuster is controlled in response to the power value detected by the power detection unit, thereby increasing/decreasing the resistance of the load side impedance and thus approximating the high frequency power to be fed from the high frequency power generation unit to the load to the setting value or keeping the same within the allowable range. As a result, it is possible to control the power that is fed to the load, without controlling the direct current voltage to be input to the inverter circuit. By this configuration, since the direct current power supply unit doesn't need to have a function of controlling the direct current output voltage and can be configured by a simple rectification smoothing circuit that rectifies/smoothes an alternating current voltage and simply outputs a constant direct current voltage, it is possible to simplify the configuration of the high frequency power supply device and to thus reduce the cost thereof.

Also, according to the configuration, since the smoothing capacitor is not a cause of delaying the control responsiveness, it is not necessary to provide a circuit that forcibly discharges the smoothing capacitor, so that it is possible to prevent the circuit configuration from being complicated.

The impedance control unit may control the variable reactance element so that the resistance of the load side impedance is decreased when the power value detected by the power detection unit is smaller than the setting value or below a lower limit of the allowable range and the resistance of the load side impedance is increased when the power value detected by the power detection unit is larger than the setting value or above an upper limit of the allowable range, thereby approximating the power detected by the power detection unit to the setting value or maintaining the same within the set allowable range.

The impedance control unit may be configured to output an abnormal signal, when the power value detected by the power detection unit is smaller than the setting value or below the lower limit of the allowable range even though the impedance control unit controls the variable reactance element so that the resistance of the load side impedance is a controllable minimum value and when the power value detected by the power detection unit is larger than the setting value or above the upper limit of the allowable range even though the impedance control unit controls the variable reactance element so that the resistance of the load side impedance is a controllable maximum value.

The state in which the power value detected by the power detection unit is smaller than the setting value or does not belong to the allowable range even though the resistance of the load side impedance is made to be the controllable minimum value and the state in which the power value detected by the power detection unit is larger than the setting value or does not belong to the allowable range even though the resistance of the load side impedance is made to be the controllable maximum value are states beyond a range in which the high frequency power to be fed to the load can be adjusted, and in which any abnormality occurs. When such a state occurs, it is necessary to stop the operation of the power supply device, for example. When the abnormal signal output means as described above is provided, it is possible to easily cope with the abnormal states.

The variable reactance element may comprise a variable capacitor that is connected in parallel with the load, and the impedance control unit may be configured to perform control of decreasing a capacitance of the variable capacitor when the power value detected by the power detection unit is smaller than the setting value or below a lower limit of the allowable range and increasing the capacitance of the variable capacitor when the power value detected by the power detection unit is larger than the setting value or above an upper limit of the allowable range.

A transformer may be provided at a rear stage of the inverter circuit, so that the high frequency power is fed from the inverter circuit to the load through the transformer.

A capacitor for direct current prevention may be inserted between the inverter circuit and the load, so that the high frequency power is fed from the inverter circuit to the load through the capacitor for direct current prevention.

The high frequency power supply device may further comprise a high frequency signal generation unit that generates a high frequency signal having a frequency as instructed by a frequency instruction, the inverter circuit may be controlled by the high frequency signal and thus converts the direct current voltage, which is output by the rectification smoothing circuit, into a high frequency alternating current voltage having the same frequency and phase as the high frequency signal.

The high frequency power supply device may further comprise a voltage detection unit that detects the output voltage of the inverter circuit, the phase difference detection unit may be configured to detect the phase difference from the phase of the current detected by the current detection unit and the phase of the voltage detected by the voltage detection unit.

When the high frequency signal generation unit, which generates the high frequency signal having a frequency as instructed by the frequency instruction, is provided, the phase difference detection unit may be configured to detect the phase difference from the phase of the current detected by the current detection unit and the phase of the high frequency signal.

When the switch element of the inverter circuit is controlled by the high frequency signal generated by the high frequency signal generation unit and thus the direct current power is converted into the high frequency power, it is possible to detect the phase difference between the current detected by the current detection unit and the output voltage of the inverter circuit from the phase of the current detected by the current detection unit and the phase of the high frequency signal generated by the high frequency signal generation unit because the phase of the high frequency signal is the same as the phase of the output voltage of the inverter circuit.

According to the invention, the impedance adjuster that adjusts the impedance of the load side circuit seen from the output terminal of the high frequency power generation unit by changing the reactance value of the variable reactance element is provided and the output frequency of the inverter circuit is controlled so that the phase of the output current of the inverter circuit is maintained at the state in which the phase of the output current is delayed with respect to the phase of the output voltage by the set delay amount, thereby securing the stability of the control. Also, the variable reactance element of the impedance adjuster is controlled in response to the power value detected by the power detection unit, thereby increasing/decreasing the resistance of the impedance of the load circuit and thus approximating the high frequency power to be fed from the high frequency power generation unit to the load to the setting value or keeping the same within the allowable range. As a result, it is possible to control the power that is fed to the load, without controlling the direct current voltage to be input to the inverter circuit. Hence, since the direct current power supply unit doesn't need to have a function of controlling the direct current output voltage and can be configured by a simple rectification smoothing circuit that rectifies/smoothes an alternating current voltage and simply outputs a constant direct current voltage, it is possible to simplify the configuration of the high frequency power supply device and to thus reduce the cost thereof.

Also, according to the invention, since the smoothing capacitor is not a cause of delaying the control responsiveness, it is not necessary to provide a circuit that forcibly discharges the smoothing capacitor, so that it is possible to prevent the circuit configuration from being complicated.

DETAILED DESCRIPTION OF THE EMBODIMENTS

Hereinafter, illustrative embodiments of the invention will be specifically described with reference to the accompanying drawings.

Figure 1:
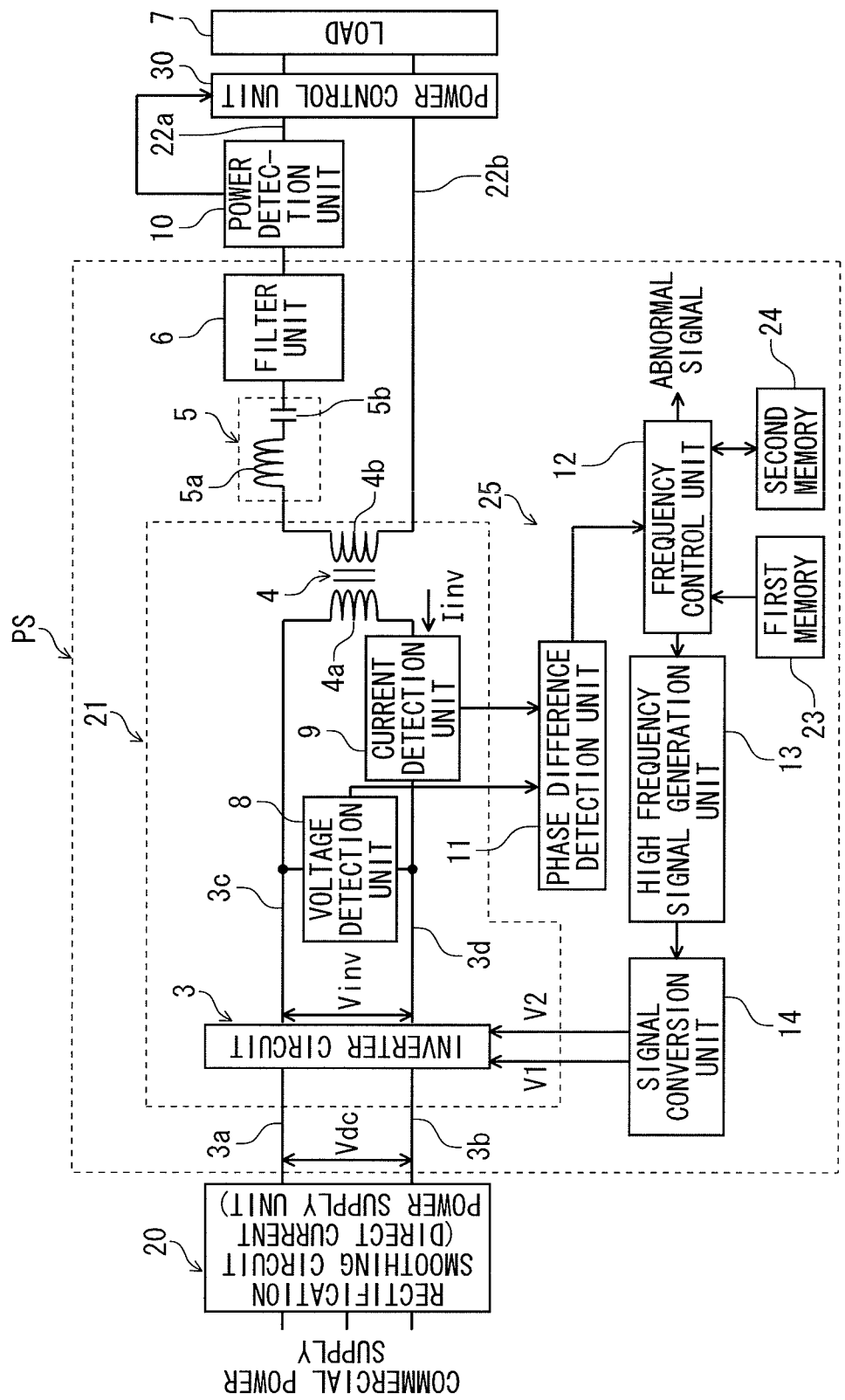
FIG. 1 is a circuit diagram showing a configuration of a high frequency power supply device according to an illustrative embodiment of the invention.

FIG. 1 shows an illustrative embodiment of a high frequency power supply device of the invention. In FIG. 1, a reference numeral 20 denotes a direct current power supply unit 3 that generates a constant direct current voltage, a reference numeral 3 denotes an inverter circuit that converts output voltage and output current of the direct current power supply unit 20 into alternating current voltage and alternating current and a reference numeral 4 denotes a transformer to which an output of the inverter circuit 3 is input. The inverter circuit 3 and the transformer 4 configure a power conversion unit 21 that converts direct current power into high frequency power.

The direct current power supply unit 20 has a rectifier that full-wave rectifies an alternating current voltage applied from a commercial power supply and a rectification smoothing circuit having a smoothing capacitor that is connected between output terminals of the rectifier, and outputs a substantially constant direct current voltage Vdc that is determined by the alternating current voltage of the commercial power supply.

Figure 9:
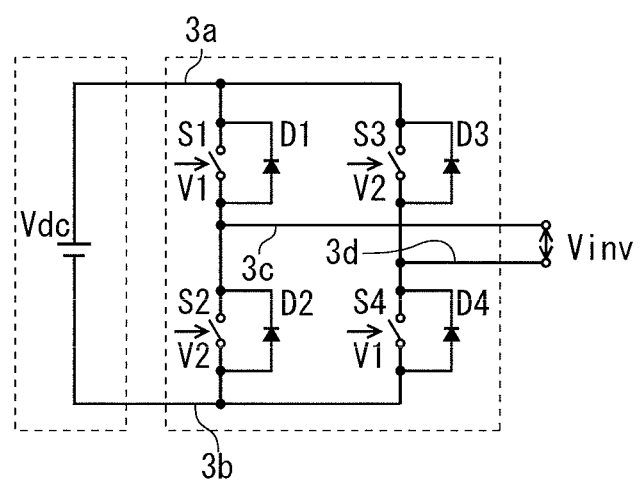
FIG. 9 is a circuit diagram showing a configuration example of an inverter circuit.

As shown in FIG. 9, the inverter circuit 3 that is used in this illustrative embodiment has a switch circuit having switch elements 51 to S4, which are H-bridged, and feedback diodes D1 to D4, which are respectively inverse-parallel connected to the switch elements 51 to S4 configuring the H bridge. The inverter circuit 3 is controlled to alternately turn on the switch elements 51, S4, which configure a pair of one opposite sides of the H bridge, and the switch elements S2, S3, which configure the other pair of the other opposite sides, thereby converting a direct current voltage Vdc applied from the direct current power supply unit 20 into a high frequency alternating current voltage Vinv having a rectangular waveform. The switch elements S1 to S4 configuring the inverter circuit 3 consist of semiconductor switch elements such as MOSFET, bipolar-type power transistors, IGBT and the like.

The inverter circuit 3 has direct current input terminals 3a, 3b and alternating current output terminals 3c, 3d, the direct current input terminals 3a, 3b are connected to output terminals of the direct current power supply unit 20 and the alternating current output terminals 3c, 3d are connected to both ends of a primary coil 4a of the transformer 4. One end of a secondary coil 4b of the transformer 4 is connected to an input terminal of a filter unit 6 consisting of a lowpass filter through a series resonance circuit 5 consisting of a series circuit of a coil 5a and a capacitor 5b and an output terminal of the filter unit 6 is connected to one output terminal 22a of a high frequency power generation unit PS through a power detection unit 10. The other end of the secondary coil 4b of the transformer 4 is connected to the other output terminal 22b of the high frequency power generation unit PS and the output terminals 22a, 22b of the high frequency power generation unit PS are connected to input terminals of a load 7 through a power control unit 30 and lines consisting of power cables and the like.

The power conversion unit 21 is provided with a voltage detection unit 8 that detects a voltage between the output terminals 3c, 3d of the inverter circuit 3 and a current detection unit 9 that detects an output current Iinv of the inverter circuit between the inverter circuit 3 and the transformer 4, and a secondary side circuit of the transformer 4 is provided with the power detection unit 10 that detects high frequency power to be applied to the load 7. The power detection unit 10 preferably detects power having a basic frequency from which a harmonic component generated from the power conversion unit 21 has been removed. Therefore, in this illustrative, as shown, the power detection unit 10 is provided at a side closer to the load than the filter unit 6.

An output of the voltage detection unit 8 and an output of the current detection unit 9 are input to a phase difference detection unit 11 that detects a phase difference of the output current of the inverter circuit 3 with respect to the output voltage. A detection value of the phase difference, which is obtained from the phase detection unit 11, is input to a frequency control unit 12 that controls an output frequency of the inverter circuit 3.

Reference numerals 23 and 24 denote a first memory and a second memory that are respectively provided to the control unit 12. The first memory 23 stores therein an upper limit frequency and a lower limit frequency that determine an upper limit and a lower limit of a frequency tuning range of the high frequency power to be applied to the load, respectively. The second memory 24 stores therein an initial value of the frequency of the high frequency power to be applied to the load 7. The initial value may be a fixed value or a value (last value) at the end time of previous control.

A reference numeral 13 denotes a high frequency signal generation unit that generates a high frequency signal of a sinusoidal waveform having a frequency, which is instructed by a frequency instruction applied from the frequency control unit 12, and a reference numeral 14 denotes a signal conversion unit that converts the high frequency signal, which is output by the high frequency signal generation unit 13, into control signals V1, V2 to be applied to the switch elements configuring the inverter circuit 3. The high frequency signal generation unit 13 is comprised of a direct digital synthesizer (DDS) that generates a sinusoidal wave signal having a frequency that is instructed by the applied frequency instruction and an amplitude that is instructed by an applied amplitude instruction.

The signal conversion unit 14 generates the first control signal V1 during a half-wave period of one polarity of the high frequency signal of the sinusoidal waveform generated by the high frequency signal generation unit 13 and generates the second control signal V2 during a half-wave period of the other polarity. The first control signal V1 is a control signal that is applied to the control terminals of the switch elements S1, S4, which configure the pair of one opposite sides of the H bridge configuring the inverter circuit 3, so as to turn on the switch elements S1, S4, and the second control signal V2 is a control signal that is applied to the control terminals of the switch elements S2, S3, which configure the pair of the other opposite sides of the H bridge configuring the inverter circuit 3, so as to turn on the switch elements S2, S3.

In this illustrative embodiment, the phase difference detection unit 11, the frequency control unit 12, the high frequency signal generation unit 13, the signal conversion unit 14 and the first and second memories 23, 24 configure an inverter control unit 25 that controls the inverter circuit 3. Also, the power conversion unit 21, the inverter control unit 25, the series resonance circuit 5 and the filter unit 6 configure a high frequency power generation unit PS that converts a direct current voltage applied from the direct current power supply unit 20 into an alternating current voltage and thus generates the high frequency power to be fed to the load, and the direct current power supply unit 20, the high frequency power generation unit PS, the power detection unit 10 and the power control unit 30 configure the high frequency power supply device of the invention.

The inverter circuit 3 alternately turns on the switch elements S1, S4 of the pair of the diagonal positions and the switch elements S2, S3 of the other pair, thereby converting the direct current voltage Vdc applied from the direct current power supply unit 20 into a high frequency alternating current voltage of a rectangular waveform having the same frequency (frequency instructed by the frequency control unit 12) and phase as the frequency signal generated by the high frequency signal generation unit 13. The alternating current voltage is applied to the series resonance circuit 5 through the transformer 4. When the alternating current voltage of a rectangular waveform is applied to the series resonance circuit 5, most of the harmonic components except for the basic wave component are removed, so that a high frequency voltage having a waveform approximate to a sinusoidal waveform is obtained. The filter unit 6 extracts only the basic frequency component from the high frequency voltage obtained through the series resonance circuit 5 and applies the high frequency power of a sinusoidal waveform to the load 7.

The transformer 4 converts the unipolar high frequency voltage of a rectangular waveform, which is output from the inverter circuit 3, into a high frequency voltage of a waveform, which changes into positive/negative polarities on the basis of a zero level, and converts an impedance of the inverter circuit 3 seen from the output terminals 22a, 22b into a load side impedance (impedance of a line for feeding power to the load 7). Regarding the line for feeding power to the load 7, a line having a characteristic impedance of 50Ω is generally used.

Figure 5:
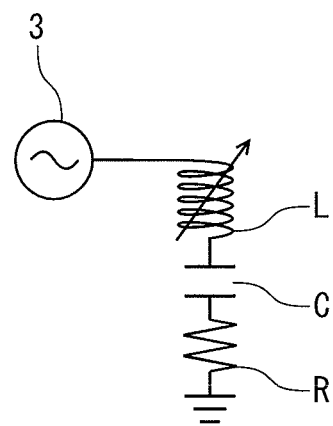
FIG. 5 is an equivalent circuit diagram showing an impedance of a load side circuit seen from an inverter circuit, in an illustrative embodiment of the invention.
Figure 6:
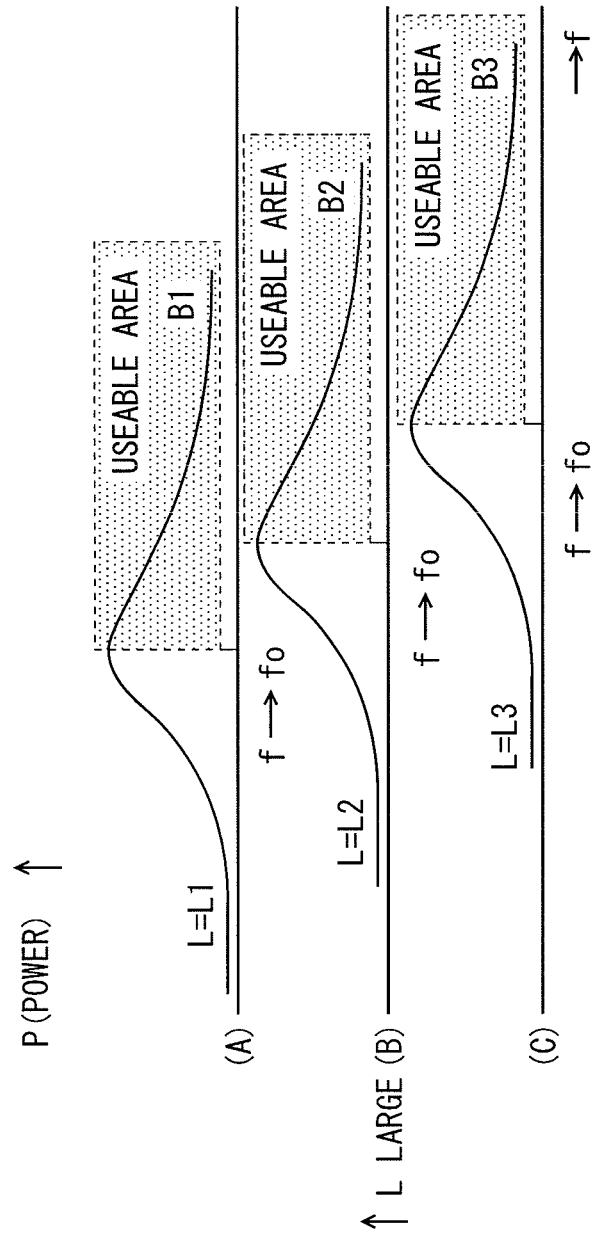
FIG. 6 includes graphs showing changes of power values of high frequency power when changing an output frequency of an inverter circuit, in which an inductance of a load side circuit seen from the inverter circuit is shown as a parameter, in a system of feeding the high frequency power from the inverter circuit to a load having a series resonance characteristic.

As described above, when feeding the high frequency power from the inverter circuit 3 to a circuit having a series resonance characteristic, an impedance of a load side circuit seen from the inverter circuit 3 can be expressed by a series circuit of an inductance L, a capacitance C and a resistance R, as shown in FIG. 5. Here, when the frequency f is changed with the inductance L of L1, L2 and L3 (L1>L2>L3), the power P to be fed to the load is changed as shown in (A) to (C) in FIG. 6. In FIG. 6, fo indicates a series resonance frequency.

As can be clearly seen from FIG. 6, when the impedance of the load side circuit seen from the inverter circuit 3 is configured to have the series resonance characteristic, the impedance of the load 7 side circuit seen from the inverter circuit 3 becomes minimum and the power P to be fed to the load becomes maximum when the output frequency of the inverter circuit 3 is the same as the series resonance frequency fo. In an area in which the output frequency of the inverter circuit 3 is higher than the series resonance frequency fo, the impedance of the load side circuit seen from the inverter circuit 3 shows an property and a phase of the output current of the inverter circuit 3 is delayed, compared to a phase of the output voltage. Also, in an area in which the output frequency of the inverter circuit 3 is lower than the series resonance frequency fo, the impedance of the load side circuit seen from the inverter circuit 3 shows a capacitance property and the phase of the output current of the inverter circuit 3 is faster than the phase of the output voltage.

In a power feeding system in which the high frequency power is fed from the inverter circuit 3 to a load side circuit having the series resonance characteristic, when the output frequency f of the inverter circuit 3 is set in the area in which the impedance of the load side circuit shows a capacitance property, a hard switching that the current flows at the moment the switch elements of the inverter circuit turn on occurs and an abnormal voltage occurs, so that a large loss is caused. Accordingly, in order to perform the stable power control when feeding the power from the inverter circuit 3, which converts the direct current voltage into the alternating current voltage by the on and off operations of the switch elements, to the load side circuit having the series resonance characteristic, it is necessary to set the output frequency of the inverter circuit 3 in the area in which the impedance of the load side circuit shows an induction property, when there is no special reason.

In FIG. 6, useable areas B1 to B3 are areas in which the phase of the current with respect to the voltage becomes a delay phase when the inductance L is L1, L2 and L3, respectively, and are areas in which it is possible to perform the stable power control when feeding the power from the inverter circuit 3, which converts the direct current voltage into the alternating current voltage by the on and off operations of the switch elements, to the load side circuit. As can be clearly seen from FIG. 6, when the output frequency of the inverter circuit 3 is in the area in which the impedance of the load side circuit is inductive, the high frequency power to be fed to the load is reduced when the output frequency f of the inverter circuit is increased and the high frequency power to be fed to the load is increased when the output frequency f of the inverter circuit 3 is decreased.

Figure 8:
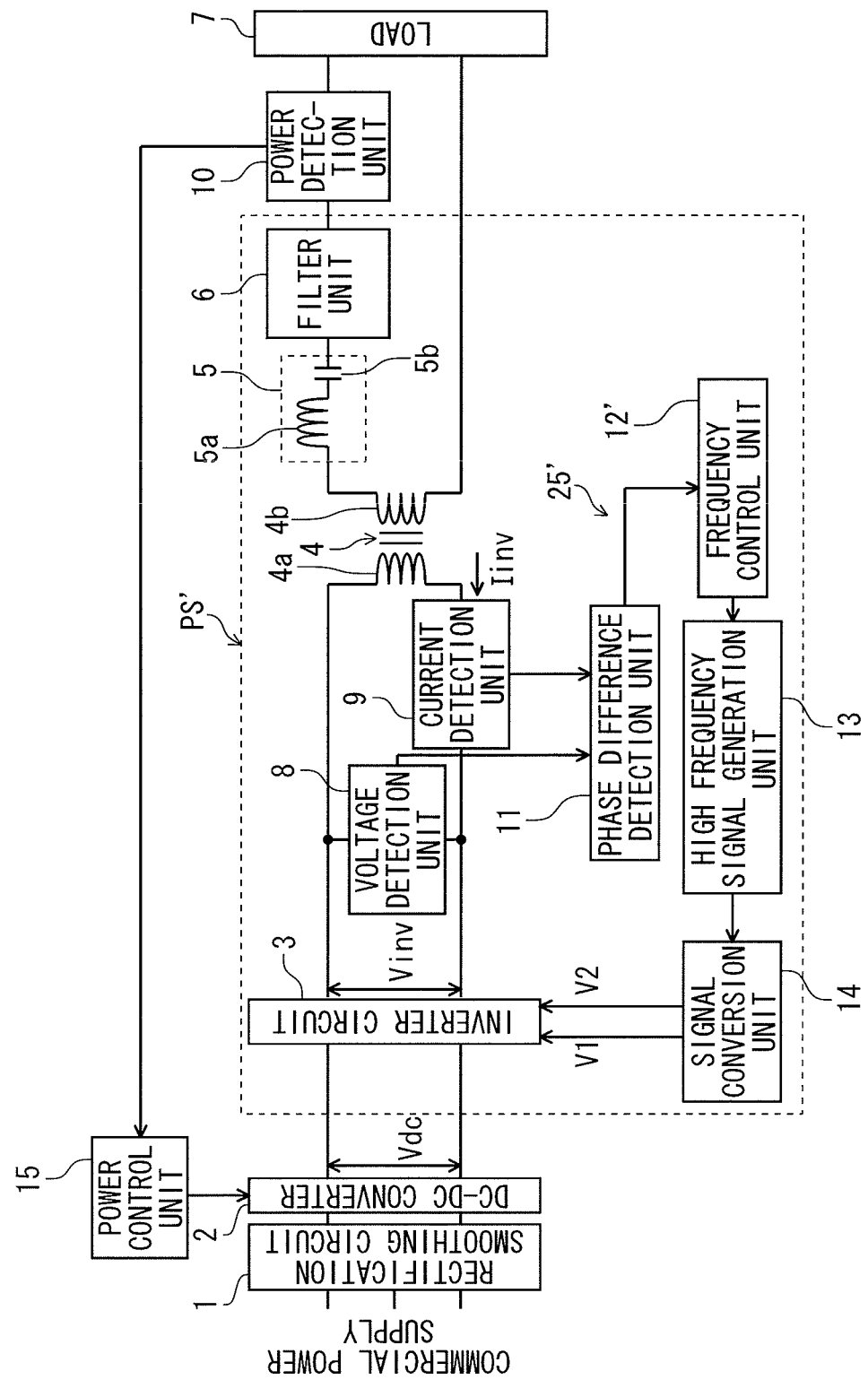
FIG. 8 is a circuit diagram showing a configuration of a high frequency power supply device according to the related art.

In the high frequency power supply device of the related art, the power to be fed to the load is controlled by changing the direct current voltage to be input to the inverter circuit at a state in which the frequency of the high frequency power is set with a frequency optimal for the impedance of the load (typically, a frequency enabling the power to be maximum). For example, in the example shown in FIG. 8, at a state in which the frequency of the high frequency power to be fed from the inverter circuit 3 to the load 7 is set with a frequency that is optimal for the impedance of the load, the DC-DC converter 2 is controlled to change the direct current voltage that is input to the inverter circuit 3, and thus the power to be fed to the load 7 is controlled. Like this, when the DC-DC converter 2 is provided to control the output voltage thereof, the configuration of the power supply device becomes complicated and the cost thereof is increased. Also, the DC-DC converter 2 has a high-capacity smoothing capacitor therein and thus it takes to lower the output voltage thereof. Thus, when the power to be applied to the load is controlled by controlling the output voltage of the DC-DC converter, the control responsiveness gets worse.

However, in this illustrative embodiment, the direct current voltage to be input to the inverter circuit 3 is made to be constant and the frequency control unit 12 controls the output frequency of the inverter circuit 3 within a predetermined range so that the phase of the current detected by the current detection unit 9 is maintained at a state in which the phase of the current is delayed with respect to the phase of the output voltage of the inverter circuit 3 by a constant delay amount. By this control, it is possible to maintain the impedance of the load 7 side circuit seen from the inverter circuit 3 at an inductive state and to stably perform the control of the power to be fed from the inverter circuit 3, which performs the current switching operation, to the load 7 without accompanying the abnormal voltage caused due to the hard switching.

Also, in this illustrative embodiment, in parallel with the above control, the power control unit 30 performs the control of approximating the power value of the high frequency power to be fed from the high frequency power generation unit PS to the load 7 to the setting value by changing the resistance of the load side impedance, which is the impedance of the load 7 side circuit seen from the output terminal of the high frequency power generation unit PS, in response to the power value detected in the power detection unit 10.

In order to perform the respective controls, in this illustrative embodiment, a load side circuit impedance control unit consisting of a circuit of the inverter circuit 3→the voltage detection unit 8 and the current detection unit 9→the phase difference detection unit 11→the frequency control unit 12→the frequency signal generation unit 13→the signal conversion unit 14→the inverter circuit 3 is configured and an output control unit consisting of the power detection unit 10 and the power control unit 30 is configured.

The load side circuit impedance control unit performs the control of maintaining the output frequency of the inverter circuit 3 in the area in which the impedance of the load side circuit shows the induction property. Also, the output control unit performs the control of approximating the power value of the high frequency power to be fed from the high frequency power generation unit PS to the load 7 to the setting value by changing the resistance of the load side impedance, which is the impedance of the load 7 side circuit seen from the output terminal of the high frequency power generation unit PS, in response to the power value detected in the power detection unit 10. The control by the load side circuit impedance control unit and the control by the output control unit are performed in parallel with each other at the same time.

When controlling the output frequency of the inverter circuit 3, a frequency range, in which the phase of the output current of the inverter circuit 3 can be maintained at a state in which the phase of the output current is delayed with respect to the phase of the output voltage by a set delay amount (the impedance of the load side circuit seen from the inverter circuit can be maintained to be inductive), is determined as a frequency tuning range, taking into consideration an expected variation range of the impedance of the load 7, and the upper limit and lower limit of the frequency tuning range are stored in the first memory 23. Also, a central value of the basic frequency of the high frequency power that is applied to the load 7 is stored as an initial value in the second memory 24.

For example, when the central frequency of the high frequency power to be applied to the load is 13.56 MHz, the upper limit of the frequency tuning range is 14.96 MHz and the lower limit is 12.16 MHz, regarding the DDS configuring the high frequency signal generation unit 13, a DDS is used which can generate a high frequency signal having a frequency in a range capable of covering the frequency tuning range, i.e., can generate a high frequency signal having a frequency in a range of 13.56±14 MHz. The frequency tuning range is appropriately set, taking into consideration performance of an oscillator, characteristics of the resonance circuit and the like.

The frequency control unit 12 shown in FIG. 1 controls the output frequency of the inverter circuit 3, as described below. The frequency control unit 12 applies a frequency instruction, which instructs generation of a high frequency signal having the same frequency as the initial value of the frequency stored in the second memory 24, to the high frequency signal generation unit 13 at the start time of control (at the startup time of the high frequency power supply device) and thus enables the high frequency signal generation unit 13 to generate a high frequency signal having the same frequency as the initial value, and enables the inverter circuit 3 to output the high frequency voltage and current having the same frequency as the initial value. Then, the frequency control unit 12 receives a phase difference of the output current Iinv of the inverter circuit 3 with respect to the output voltage Vinv from the phase difference detection unit 11 and compares the received phase difference with the set phase difference. As a result, when a delay amount of the phase of the output current Iinv with respect to the phase of the output voltage Vinv is larger than the set delay amount, the frequency control unit lowers the output frequency of the inverter circuit 3 within a range that is not less than the lower limit of the frequency tuning range stored in the first memory 23. When a delay amount of the phase of the output current Iinv with respect to the phase of the output voltage Vinv is smaller than the set delay amount, the frequency control unit changes the frequency instruction that is applied to the high frequency signal generation unit 13, depending on the delay amount of the phase of the output current Iinv with respect to the phase of the output voltage Vinv, so as to increase the output frequency of the inverter circuit 3 within a range that is not more than the upper limit of the frequency tuning range stored in the first memory 23. Thereby, the frequency control unit keeps the delay amount of the phase of the output current Iinv with respect to the phase of the output voltage Vinv at the set delay amount.

Figure 2:
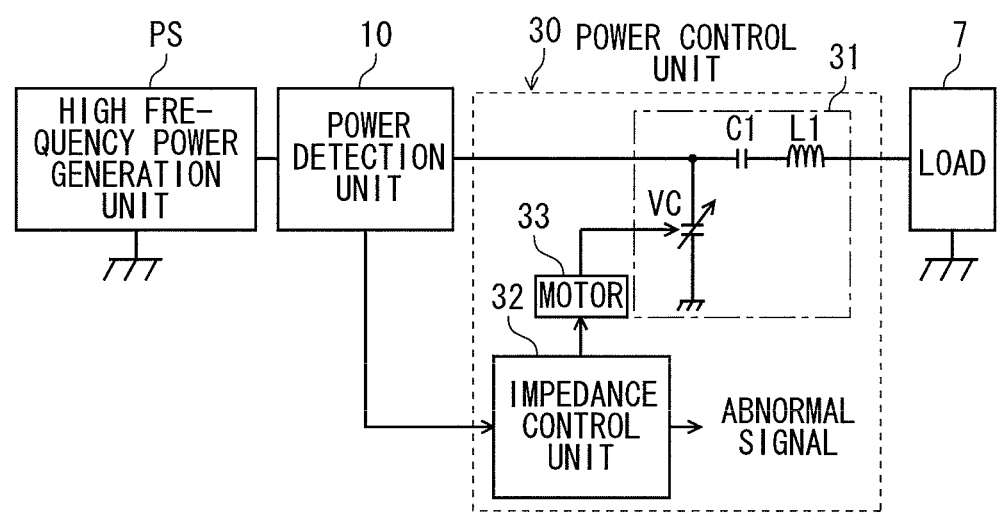
FIG. 2 is a circuit diagram showing a configuration example of a power control unit that is used in the illustrative embodiment of FIG. 1.

As shown in FIG. 2, the power control unit 30 is provided between the output terminal of the high frequency power generation unit PS and the load 7 and has an impedance adjuster 31 that adjusts the impedance of the load side circuit seen from the output terminal of the high frequency power generation unit PS and an impedance control unit 32 that controls a variable reactance element provided to the impedance adjuster 31 in response to the power value detected by the power detection unit 10 so as to perform the control of approximating the power value of the high frequency power, which is fed from the high frequency power generation unit PS to the load 7, to the setting value by changing the resistance of the load side impedance, which is the impedance of the load 7 side circuit seen from the high frequency power generation unit PS, in response to the power value detected by the power detection unit 10.

The impedance adjuster 31 has a fixed capacitor C1, an inductor L1 that is connected in series with the capacitor C1 and a variable capacitor VC serving as the variable reactance element that is connected between one end of the series circuit of the capacitor C1 and the inductor L1 and a ground. Thereby, one end of the series circuit of the capacitor C1 and the inductor L1 is connected to the non-grounded side output terminal of the high frequency power generation unit PS. The other end of the series circuit of the capacitor C1 and the inductor L1 is connected to the non-grounded side terminal of the load 7 through the line having a characteristic impedance of 50Ω and the variable capacitor V is connected in parallel with the load 7 through the capacitor C1 and the inductor L1.

Figure 7:
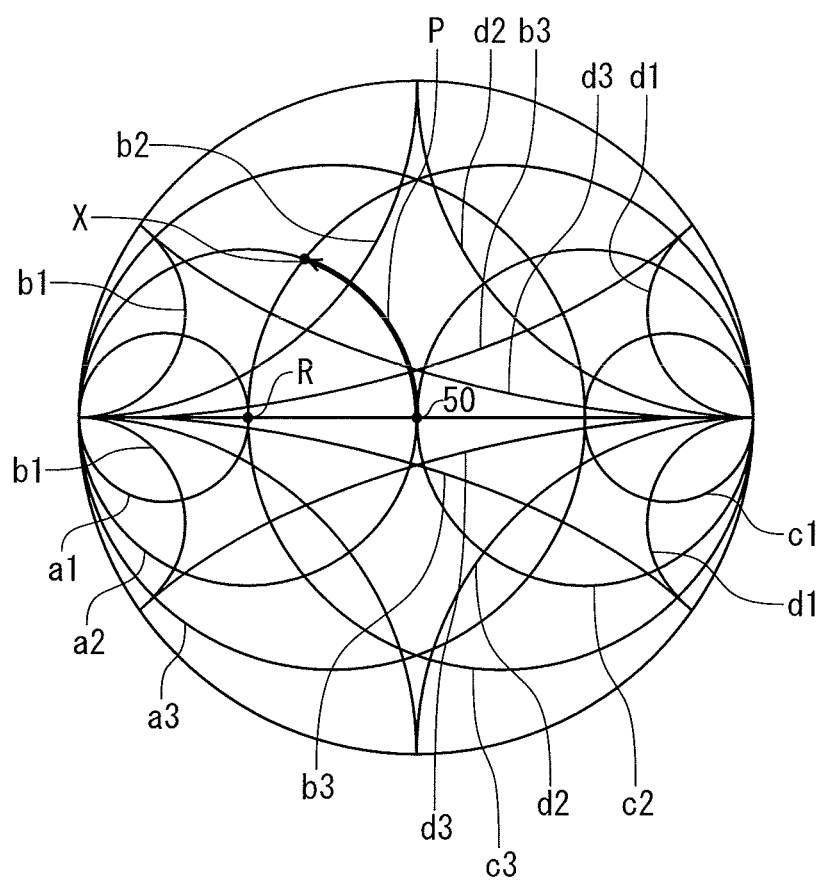
FIG. 7 is a Smith chart that is used so as to describe an illustrative embodiment of the invention.

In the power control unit 30 shown in FIG. 2, when a capacitance of the variable capacitor VC is increased, the resistance of the load side impedance is increased, and when the capacitance of the variable capacitor VC is decreased, the resistance of the load side impedance is decreased. The change of the resistance of the load side impedance, which is accompanied by the change of the capacitance of the variable capacitor VC, can be described by using a Smith chart shown in FIG. 7. The Smith chart shown in FIG. 7 illustrates an impedance chart and an admittance chart that are overlapped with each other. In FIG. 7, reference numerals a1, a2 and a3 and b1, b2 and b3 denote constant conductance circles and constant susceptance circles configuring the admittance chart, respectively, and reference numerals c1, c2 and c3 and d1, d2 and d3 denote constant resistance circles and constant reactance circles configuring the impedance chart, respectively.

In the impedance adjuster 31 shown in FIG. 2, assuming that the resistance of the impedance of the load side circuit seen from the high frequency power generation unit PS is 50Ω, when the capacitance of the variable capacitor VC is decreased, an admittance of the load 7 side circuit seen from the high frequency power generation unit PS is moved on the constant conductance circle a2 of FIG. 7 in the arrow P direction, for example up to a point X. At this time, the impedance (load side impedance) of the load 7 side circuit seen from the high frequency power generation unit PS exists on the constant resistance circle c3 passing to the point X. The resistance of the load side impedance existing on the constant resistance circle c3 is RΩ (<50Ω). Accordingly, it is possible to reduce the resistance of the load side impedance from 50Ω to RΩ by decreasing the capacitance of the variable capacitor VC. Also, when the capacitance of the variable capacitor VC is increased at a state in which the admittance of the load 7 side circuit seen from the high frequency power generation unit PS exists on the point X, the admittance of the load side circuit is moved in an opposite direction to the arrow P and a radius of the circle on which the load side impedance rides is correspondingly reduced, so that the resistance of the load side impedance is increased. From this, it can be seen that in the impedance adjuster 31 shown in FIG. 2, it is possible to reduce the resistance of the load side impedance by decreasing the capacitance of the variable capacitor VC and to increase the resistance of the load side impedance by increasing the capacitance of the variable capacitor VC.

The impedance control unit 32 shown in FIG. 2 performs the control of decreasing the capacitance of the variable capacitor VC when the power value detected by the power detection unit 10 is smaller than the setting value and increasing the capacitance of the variable capacitor VC when the power value detected by the power detection unit 10 is larger than the setting value, thereby changing the resistance of the load side impedance in response to the power value detected by the power detection unit 10 and thus approximating the power value of the high frequency power to be fed from the high frequency power generation unit PS to the load 7 to the setting value.

In the shown example, an actuator having a motor 33 for operating an operation unit of the variable capacitor VCx is provided and a rotating direction and a rotating amount of the motor 33 are controlled by the impedance control unit 32, so that the capacitance of the variable capacitor VC is adjusted. In this case, the impedance control unit 32 controls the motor 33 so that the capacitance of the variable capacitor VC is decreased when the power value detected by the power detection unit 10 is larger than the setting value and the capacitance of the variable capacitor VC is increased when the power value detected by the power detection unit 10 is smaller than the setting value, thereby performing the control of approximating the power value of the high frequency power to be fed from the high frequency power generation unit PS to the load 7 to the setting value.

In order to perform the above control, the impedance control unit 32 reads out the power value detected by the power detection unit 10 whenever a predetermined sample timing has come, compares the read power value with the setting value, determines whether to increase or to decrease the capacitance of the variable capacitor VC, depending on a result of the comparison, and controls the motor 33 so that the capacitance of the variable capacitor VC can be changed in the determined direction. Thereby, the resistance of the load side impedance is changed and the power value detected by the power detection unit 10 is approximated to the setting value. When the phase of the current detected by the current detection unit 9 is kept at the state in which the phase of the current is delayed with regard to the phase of the output voltage of the inverter circuit, the load side impedance exists in an area of a half circle on the Smith chart shown in FIG. 7. Therefore, a relation is satisfied in which when the capacitance of the variable capacitor VC is decreased, the resistance of the load side impedance is decreased and when the capacitance of the variable capacitor is increased, the resistance of the load side impedance is increased. Hence, it is possible to determine whether to decrease or to increase the capacitance of the variable capacitor VC by comparing the power value detected by the power detection unit 10 with the setting value.

In the above descriptions, the power control unit 30 performs the control of approximating the power value detected by the power detection unit 10 to the setting value. However, the power control unit 30 may be also configured to perform control of maintaining the power detected by the power detection unit 10 in a set allowable range. When performing the control of maintaining the power detected by the power detection unit 10 in a set allowable range, it may be preferable that the upper limit and lower limit of the allowable range of the power value are set and the impedance adjuster 31 is controlled so that the resistance of the load side impedance is increased when the detected power value exceeds the upper limit of the allowable range and the resistance of the load side impedance is decreased when the detected power value is below the lower limit of the allowable range.

In this illustrative embodiment, when the power value detected by the power detection unit is smaller than the setting value even though the impedance control unit 32 controls the variable reactance element so that the resistance of the load side impedance is the controllable minimum value and when the power value detected by the power detection unit is larger than the setting value even though the impedance control unit controls the variable reactance element so that the resistance of the load side impedance is the controllable maximum value, an abnormal signal is output.

The state in which the power value detected by the power detection unit is smaller than the setting value or does not belong to the allowable range even though the variable reactance element is controlled so that the resistance of the load side impedance is the controllable minimum value and the state in which the power value detected by the power detection unit is larger than the setting value or does not belong to the allowable range even though the variable reactance element is controlled so that the resistance of the load side impedance is the controllable maximum value are states beyond a range in which the high frequency power to be fed to the load can be adjusted, and in which any abnormality occurs. When such a state occurs, it is necessary to stop the operation of the power supply device, for example. When the abnormal signal output means as described above is provided, it is possible to easily cope with the abnormal states.

In order to cope with the abnormal states, the impedance control unit 32 has an abnormal signal output means that, when changing the capacitance of the variable capacitor VC by controlling the motor 33, monitors a rotating angle position of the motor 33 by checking whether the rotating angle position of the motor 33 is within a predetermined allowable range and outputs an abnormal signal when the power value detected by the power detection unit 10 is not the setting value or does not belong to the allowable range even though the motor 33 is rotated to a limit position of the allowable range. It is preferable to take safety measures such as stopping of the high frequency power feeding to the load when outputting the abnormal signal.

As described above, in order to stably operate the inverter circuit without enabling the switch elements of the inverter circuit 3 to perform the hard switching, it is necessary to keep the phase of the output current of the inverter circuit 3 with respect to the output voltage at a range of the delay phase (range of the useable areas B1 to B3 in FIG. 6). In this illustrative embodiment, while the power control unit 30 controls the impedance adjuster 31 to increase/decrease the resistance of the load side impedance, thereby approximating the high frequency power to be applied to the load to the setting value or keeping the same within the allowable range, the frequency control unit 12 controls the output frequency of the inverter circuit 3 so that the phase of the output current of the inverter circuit 3 is maintained at the state in which the phase is delayed with respect to the phase of the output voltage. However, even when the frequency control unit 12 controls the output frequency of the inverter circuit 3 while controlling the power value of the high frequency power to be fed to the load, it may not be possible to delay the phase of the output current of the inverter circuit with respect to the phase of the output voltage, depending on the values of the capacitance of the variable capacitor VC. At such a state, it is not possible to maintain the impedance of the load side circuit seen from the inverter circuit at the inductive state. Therefore, the switching operation of the switch elements configuring the inverter circuit becomes the hard switching state, so that an abnormal voltage may occur or an output waveform may be distorted.

In order to cope with the abnormal state, in this illustrative embodiment, the frequency control unit 12 is provided with an abnormal signal generation means that outputs an abnormal signal, when it is not possible to keep the phase of the current detected by the current detection unit 9 at the state in which the phase is delayed with respect to the phase of the output voltage even though the frequency control unit 12 changes the output frequency of the inverter circuit 3 within the frequency tuning range. The abnormal signal may be used to generate a warning and may be used as a signal for driving a switch means that forcibly cuts off the high frequency power feeding to the load.

When the power control unit 30 is configured as described above, it is not necessary to control the direct current voltage that is input to the inverter circuit 3. Therefore, the direct current power supply unit 20 can be made to have a simple configuration in which the function of controlling the direct current output voltage is not provided, so that it can be configured by a simple rectification smoothing circuit that rectifies/smoothes an alternating current voltage and simply outputs a constant direct current voltage.

Also, according to the above configuration, since the smoothing capacitor is not a cause of delaying the control responsiveness, it is not necessary to provide a circuit that forcibly discharges the smoothing capacitor, so that it is possible to simplify a circuit configuration.

In the above illustrative embodiment, only one power conversion unit 21 is provided. However, when it is not possible to sufficiently feed the power to the load by only one power conversion unit 21, it may be possible to provide a plurality (four in the shown example) of power conversion units 21A to 21D in which the phases of the output voltages and output currents of the inverter circuits 3 are the same, to synthesize the outputs of the power conversion units and to supply the synthesized output to the load through the series resonance circuit 5 and the filter unit 6. In the shown example, the secondary coils of the transformers 4 of the power conversion units 21A to 21D are connected in parallel, so that a synthesis circuit 40 of synthesizing the outputs of the power conversion units 21A to 21D is configured.

Figure 3:
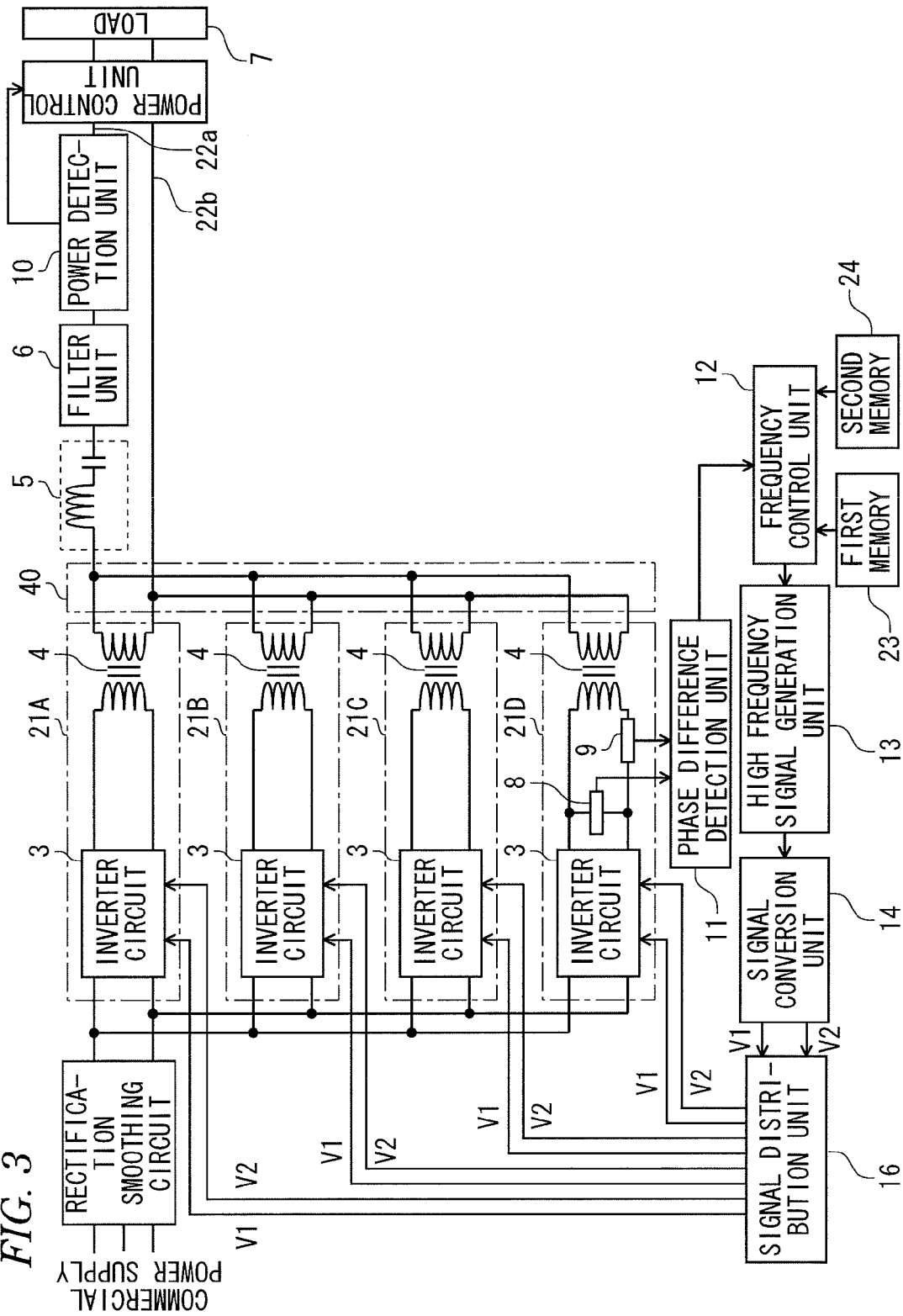
FIG. 3 is a circuit diagram showing a configuration of a high frequency power supply device according to another illustrative embodiment of the invention.

For the configuration shown in FIG. 3, the control signals V1, V2 that are generated by the signal conversion unit 14 are distributed to the inverter circuits 3 of the power conversion units 21A to 21D by a signal distribution unit 16 and the high frequency signals having the same phase are generated from the inverter circuits 3 of the power conversion units 21A to 21D. By such a configuration, since the phases of the output voltages and output currents of the inverter circuits 3 of the power conversion units 21A to 21D are the same, it is preferable to provide the voltage detection unit 8 and the current detection unit 9 to any one of the power conversion units. In the example shown in FIG. 3, the voltage detection unit 8 and the current detection unit 9 are provided to the power conversion unit 21D.

In the example shown in FIG. 3, the secondary coils of the transformers 4 of the power conversion units 21A to 21D are connected in parallel, so that the synthesis circuit 40 of synthesizing the outputs of the power conversion units 21A to 21D is configured. However, the configuration of the synthesis circuit 40 is not limited to the example shown in FIG. 3 and a synthesis circuit having a well-known configuration may be also used.

In the above illustrative embodiment, the power conversion unit 21 is configured by the inverter circuit 3 and the transformer 4. However, a configuration may be also possible in which the series resonance circuit 5 and the filter unit 6 are also included in the power conversion unit and the synthesis circuit is provided at a rear stage thereof.

In the above illustrative embodiment, the current detection unit 9 that detects the output current of the inverter circuit and the voltage detection unit 8 that detects the output voltage of the inverter circuit are provided between the inverter circuit 3 and the transformer 4 and the phase difference detection unit is configured to detect the phase difference between the output current and output voltage of the inverter circuit from the phase of the current detected by the current detection unit 9 and the phase of the voltage detected by the voltage detection unit 8. However, the invention is not limited to the configuration of the phase difference detection unit. For a configuration in which the high frequency signal generation unit 13, which generates the high frequency signal having a frequency as instructed by the frequency instruction, is provided, the inverter circuit is controlled by the high frequency signal generated by the high frequency signal generation unit and thus the direct current voltage output by the direct current power supply unit is converted into the harmonic alternating current voltage having the same frequency and phase as the high frequency signal, like the above illustrative embodiment, since the output voltage of the inverter circuit has the same phase as the high frequency signal generated by the high frequency signal generation unit 13, it may be possible to detect the phase difference between the output current and output voltage of the inverter circuit from the phase of the current detected by the current detection unit 9 and the phase of the high frequency signal generated by the high frequency signal generation unit 13 because the output voltage of the inverter circuit has the same phase as the high frequency signal generated by the high frequency signal generation unit 3. By this configuration, it is possible to omit the voltage detection unit 8, so that it is possible to simplify the configuration of the device.

In the above illustrative embodiment, the output of the inverter circuit 3 is supplied to the load through the transformer 4. However, the high frequency power supply device of the invention may simply have such a configuration that the direct current power supply unit 20, which rectifies/smoothes an alternating current voltage and thus outputs a direct current voltage, and the inverter circuit 3, which converts the direct current voltage output by the direct current power supply unit 20 into the high frequency alternating current voltage, are provided and the high frequency power is fed from the inverter circuit 3 to the load 7, and the circuit configuration between the inverter circuit 3 and the load 7 is not limited to the above illustrative embodiment.

Figure 4:
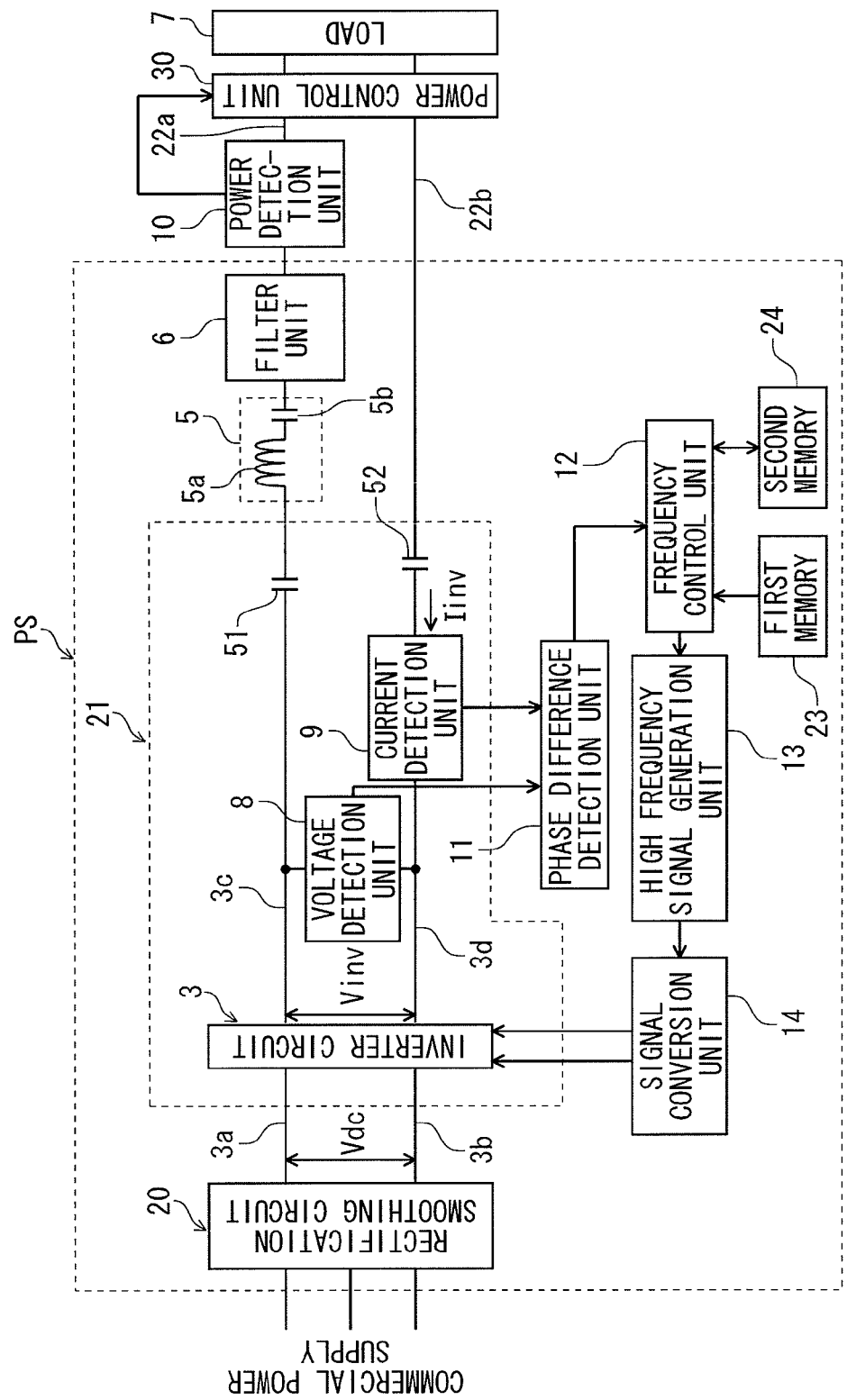
FIG. 4 is a circuit diagram showing a configuration of a high frequency power supply device according to still another illustrative embodiment of the invention.

For example, as shown in FIG. 4, capacitors 51, 52 for direct current prevention are respectively inserted between the alternating current output terminal 3c of the inverter circuit 3 and the series resonance circuit 5 and between the alternating current output terminal 3d and the output terminal 22b of the high frequency power generation unit PS, without using the transformer, so that the high frequency power is fed from the inverter circuit 3 to the load 7 through the capacitors 51, 52 for direct current prevention.

Also, in the above illustrative embodiment, the series resonance circuit 5 is inserted between the transformer 4 and the filter unit 6. However, when the load 7 side circuit seen from the inverter circuit 3 has the series resonance characteristic, the series resonance circuit 5 may be omitted.

The impedance adjuster 31 provided to the power control unit 30 may consist of a plurality of reactance elements having at least one variable reactance element and the reactance value of the variable reactance element may be changed to adjust the load side impedance, which is the impedance of the load side circuit seen from the output terminal of the high frequency power generation unit, and is not limited to the above illustrative embodiment. For example, in FIG. 2, a π type impedance adjuster in which a capacitor is connected between the load side terminal of the inductor L1 and the ground may be also used. However, in order to prevent the loss in the power control unit 30, an impedance adjuster consisting of only a reactance element (which does not include a resistance element) is preferably used.

The high frequency power supply device of the invention can be widely used as a power supply of the load to which it is necessary to feed the high frequency power, such as plasma generation device and laser transmitter. According to the invention, by making the direct current voltage, which is input to the inverter circuit 3, constant and increasing/decreasing the resistance of the load side impedance that is the impedance of the load side circuit seen from the output terminal of the high frequency power generation unit, the high frequency power to be fed to the load is controlled. Accordingly, it is possible to simplify the configuration of the direct current power supply unit and to thus reduce the cost. Also, since it is possible to control the high frequency power that is applied to the load, without being influenced by the high-capacity smoothing capacitor, it is possible to favorably make the control responsiveness. Like this, since the invention contributes to the cost reduction and performance improvement of the high frequency power supply device, the industrial applicability thereof is high.

What is claimed is:

1. A high frequency power supply device, comprising:
a direct current power supply configured to rectify and smooth an alternating current voltage and output a direct current voltage;
a high frequency power generator having an inverter circuit configured to convert the direct current voltage output from the direct current power supply into an alternating current voltage, the high frequency power generator configured to generate high frequency power that is fed from the inverter circuit to a load;
a power controller configured to control a power value of the high frequency power, which is to be fed from the high frequency power generator to the load, to be approximately a setting value or to control of the power value to be maintained within a set allowable range;
a current detector configured to detect an output current of the inverter circuit;
a phase difference detector configured to detect a phase difference between the current detected by the current detector and an output voltage of the inverter circuit;
a power detector configured to detect the power value of the high frequency power to be fed to the load; and
a frequency controller configured to control an output frequency of the inverter circuit within a predetermined frequency tuning range so that a phase of the current detected by the current detector is maintained at a state in which the phase is delayed with respect to a phase of the output voltage of the inverter circuit by a set delay amount, based on an input that is the phase difference detected by the phase difference detector,
wherein the power controller comprises an impedance adjuster that comprises a plurality of reactance elements including at least one variable reactance element and adjusts a load side impedance, which is an impedance of a load side circuit from an output terminal of the high frequency power generator, by changing a reactance value of the variable reactance element, and an impedance controller that controls the variable reactance element of the impedance adjuster in response to the power value detected by the power detector to control the power value of the high frequency power, which is fed from the high frequency power generator to the load, to be approximately the setting value or to control the power value to be maintained within the set allowable range by changing a resistance of the load side impedance in response to the power value detected by the power detector.

2. The high frequency power supply device according to claim 1, wherein the impedance controller controls the variable reactance element so that the resistance of the load side impedance is decreased when the power value detected by the power detector is smaller than the setting value or below a lower limit of the allowable range and the resistance of the load side impedance is increased when the power value detected by the power detector is larger than the setting value or above an upper limit of the allowable range, thereby approximating the power detected by the power detector to the setting value or maintaining the power within the set allowable range.

3. The high frequency power supply device according to claim 2, wherein the impedance controller is configured to output an abnormal signal, when the power value detected by the power detector is smaller than the setting value or below the lower limit of the allowable range even though the impedance controller controls the variable reactance element so that the resistance of the load side impedance is a controllable minimum value and when the power value detected by the power detector is larger than the setting value or above the upper limit of the allowable range even though the impedance controller controls the variable reactance element so that the resistance of the load side impedance is a controllable maximum value.

4. The high frequency power supply device according to claim 2, wherein the frequency controller is configured to output an abnormal signal, when the phase of the current detected by the current detector does not remain at the state in which the phase is delayed with respect to the phase of the output voltage of the inverter circuit, even though the frequency controller changes the output frequency of the inverter circuit within the frequency tuning range.

5. The high frequency power supply device according to claim 1, wherein the load side circuit from the high frequency power generator is configured to have a series resonance characteristic.

6. The high frequency power supply device according to claim 1,
wherein the variable reactance element comprises a variable capacitor that is connected in parallel with the load, and
wherein the impedance unit controller is configured to decrease a capacitance of the variable capacitor when the power value detected by the power detector is smaller than the setting value or is below a lower limit of the allowable range and increase the capacitance of the variable capacitor when the power value detected by the power detector is larger than the setting value or is above an upper limit of the allowable range.

7. The high frequency power supply device according to claim 1, wherein a transformer is provided at a rear stage of the inverter circuit, so that the high frequency power is fed from the inverter circuit to the load through the transformer.

8. The high frequency power supply device according to claim 1, wherein a capacitor for direct current prevention is inserted between the inverter circuit and the load, so that the high frequency power is fed from the inverter circuit to the load through the capacitor for direct current prevention.

9. The high frequency power supply device according to claim 1, further comprising a high frequency signal generator that generates a high frequency signal having a frequency set by a frequency instruction,
wherein the inverter circuit is controlled by the high frequency signal and converts the direct current voltage, which is output by the rectification smoothing circuit, into a high frequency alternating current voltage having the same frequency and phase as the high frequency signal.

10. The high frequency power supply device according to claim 1, further comprising a voltage detector that detects the output voltage of the inverter circuit, wherein the phase difference detector is configured to detect the phase difference from the phase of the current detected by the current detector and the phase of the voltage detected by the voltage detector.

11. The high frequency power supply device according to claim 9, wherein the phase difference detector is configured to detect the phase difference between the phase of the current detected by the current detector and a phase of the high frequency signal generated by the high frequency signal generator.

* * * * *

UNITED STATES PATENT AND TRADEMARK OFFICE
CERTIFICATE OF CORRECTION

PATENT NO. : 8,817,509 B2
APPLICATION NO. : 13/417674
DATED : August 26, 2014
INVENTOR(S) : Michio Taniguchi et al.

It is certified that error appears in the above-identified patent and that said Letters Patent is hereby corrected as shown below:

In the Claims

At column 19, line 28 (claim 1), the expression "to control of the" should read -- to control the --.

At column 20, line 38 (claim 6), the expression "unit controller is" should read -- controller is --.

Signed and Sealed this
Nineteenth Day of May, 2015

Michelle K. Lee
*Director of the United States Patent and Trademark Office*